Jan. 7, 1936. S. N. WIGHT Re. 19,814
INTERLOCKING SYSTEM FOR RAILROADS
Original Filed July 18, 1929
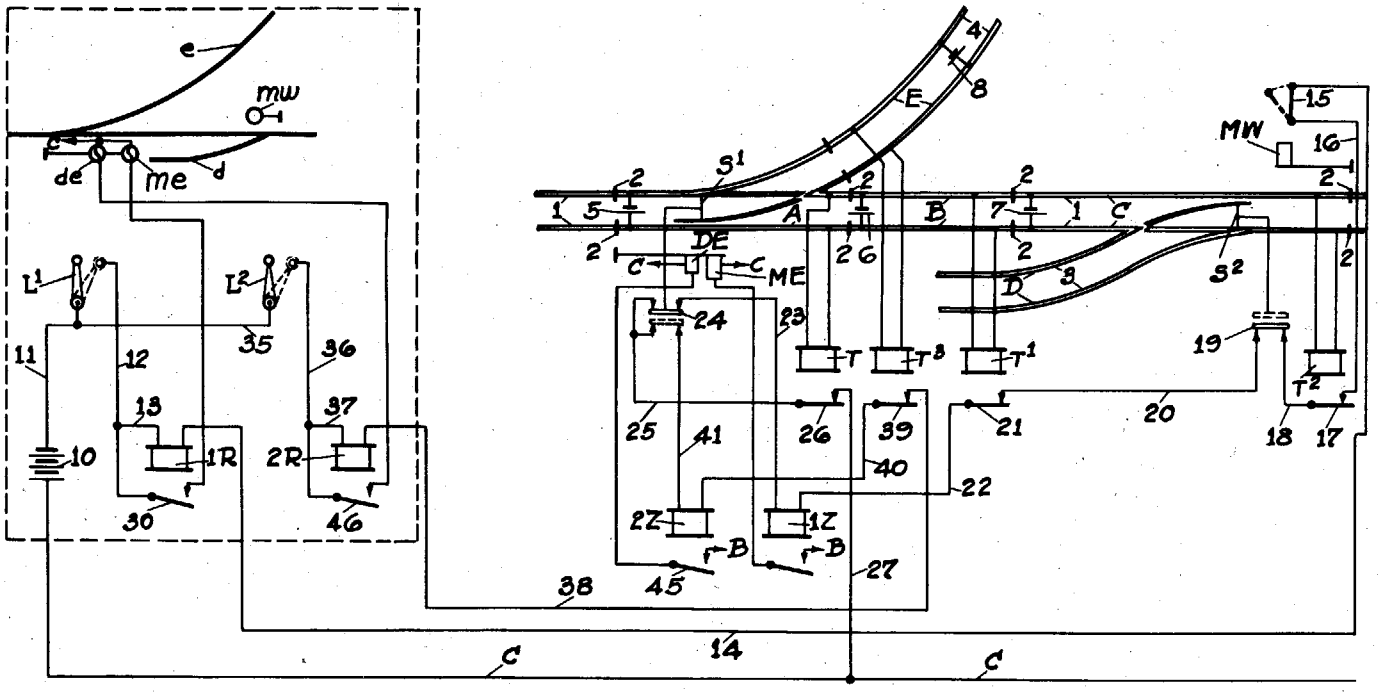
INVENTOR
BY S. N. Wight.
Neil W. Preston,
his ATTORNEY Reissued Jan. 7, 1936

Re. 19,814

UNITED STATES PATENT OFFICE 19,814

INTERLOCKING SYSTEM FOR RAILROADS

Sedgwick N. Wight, Rochester, N. Y., assignor to General Railway Signal Company, Rochester, N. Y.

Original No. 1,824,181, dated September 22, 1931, Serial No. 379,176, July 18, 1929. Application for reissue September 9, 1932, Serial No. 632,437

8 Claims. (Cl. 246—3)

This invention relates to interlocking systems, and more particularly to a novel interlocking system in which all of the interlocking is carried on directly between traffic controlling devices rather than between levers controlling such traffic controlling devices.

As understood by those skilled in the art of interlocking practice, it is essential that no traffic controlling device should be permitted to assume a particular indicating or control condition unless all conflictable traffic controlling devices are in a non-conflicting condition. In mechanical interlocking plants it is found expedient to have the interlocking mechanism associated with the levers, this for mechanical and structural reasons. During the evolution of interlocking practice this theory of interlocking levers mechanically has been carried on to interlocking plants employing electrically controlled traffic controlling devices.

In accordance with the present invention it is proposed to leave the control levers free for movement in any direction at all times, and to so interlock the circuits controlled by these levers, through contacts controlled by the various traffic controlling devices, that it is impossible to supply clearing or operating energy to any particular traffic controlling device unless all of the conflictable traffic controlling devices have been operated to their non-conflicting positions or conditions.

Another object of the present invention resides in the provision of means for indicating in the tower if a particular traffic controlling device cannot be operated by reason of the fact that there is a conflictable traffic controlling device in its conflicting position or condition.

Other objects, purposes and characteristic features of the invention will in part be described hereinafter and in part be obvious from the accompanying drawing.

In describing the invention in detail reference will be made to the accompanying drawing which conventionally shows the control circuits and devices of a particular way station together with a lever and indicating apparatus located in the dispatcher's office.

Referring to the drawing the main track of a railway system has been shown by track rails 1 divided into track sections by insulating joints 2, of which the track sections A, B and C only have been shown. From this main track diverge the routes D and E, comprising rails 3 and 4 respectively. Each of these track sections is provided with the usual track circuit, of which the track section A has a track circuit including the battery 5 and the track relay T, the track circuit of section B includes the track relay $T^1$ and the battery 6, the track section C has a track circuit including the battery 7 and the track relay $T^2$, and the track circuit of section E contains the track relay $T^3$ and the track battery 8.

The diverging route E is connected to the main track through the medium of the track switch $S^1$ and the diverging route D is connected to the main track through the medium of the track switch $S^2$. At the entrance to the diverging route E is located a main signal ME and a take-siding signal DE, whereas at the entrance to the diverging route D there is located a main west-bound signal MW. The switches $S^1$ and $S^2$ are provided with the usual switch box contacts, which contacts are included in the interlocking circuits more clearly described in connection with the operation of the system. Also, if desired, these switches $S^1$ and $S^2$ may be operated by switch machines controlled by control relays and indicating track circuit occupancy in a manner as shown in the application of F. L. Dodgson, Ser. No. 187,508, filed April 29, 1927.

In the interlocking tower, the entire interlocking plant or plants are preferably reproduced in miniature, and for convenience only that part of the railway system shown in the drawing has been shown reproduced in miniature in the interlocking tower. This miniature track layout shows the diverging route *e* and the diverging route *d* as well as the miniature wayside signals *me*, *de* and *mw*. In the particular arrangement shown, the main signal ME is controlled by lever $L^1$ and the take-siding signal DE is controlled by the lever $L^2$. It is believed that the novel features and operating characteristics of the system will be best understood by considering the operation of the system.

*Operation*

Although the switches $S^1$ and $S^2$ may be either hand-operated from a local switch stand, or operated from the interlocking tower either mechanically or electrically, it is for convenience assumed that these track switches are operated from the dispatcher's office by mechanical means such as pipe lines or cables.

Let us assume that both of these track switches $S^1$ and $S^2$ assume the main track position. Let us further assume that the operator wishes to clear the main signal ME. In order to do so the operator will operate the lever $L^1$ to its dotted proceed position, thereby completing the following circuit:—beginning at the tower battery 10, wire 11, lever $L^1$, wires 12 and 13, winding of the indicating relay 1R, line wire 14, contact 15 on the west-bound signal MW, wire 16, front contact 17 of the track relay $T^2$, wire 18, switch box contact 19, wire 20, front contact 21 of the track relay $T^1$, wire 22, winding of the control relay 1Z, wire 23, switch box contact 24, wire 25, front contact 26 of the track relay T, wire 27, common return wire C to the negative terminal of battery 10. Under this assumed condition of the various track relays and switch box contacts in the circuit just traced, the control relay 1Z will assume its energized position. With the control relay 1Z assuming its energized position, the main signal ME is free to assume its proceed position, providing traffic conditions in advance thereof are clear. In this connection it may be pointed out that the circuit just traced in itself checks traffic conditions to the next opposing signal in advance, but in some cases the signal ME, may if desired, be prevented from assuming its proceed position because there is another train in the next section ahead of the track section C by the inclusion of suitable signal blade or line relay contacts in said circuit. With the circuit through the control relay 1Z closed, this on the assumption that there is no conflicting route set up, the indicating relay 1R will assume its energized position, thereby closing an energizing circuit through the indicating lamp *me*, which circuit includes the front contact 30 of the indicating relay 1R.

Should now an east-bound train accept the signal ME in its proceed position, and should it move into the track section A the track relay T would assume its de-energized position, thereby breaking the energizing circuit for the relay 1Z at the contact 26 of the track relay T, and in turn effect deenergization of the indicating relay 1R and extinguishment of the indicating lamp *me*. Similarly, occupancy of the track sections B and C will effect extinguishment of the indicating lamp *me* through the medium of the opening of contacts 21 and 17 of the relays $T^1$ and $T^2$. The operator will thus be informed of the entrance of the train into the section of track A, B, and C.

Let us now assume that the operator returns the lever $L^1$ back to its normal position, and through the medium of a large lever, (not shown) which acts through mechanical means to operate the track switch $S^1$, operates the switch $S^1$, to the take-siding position. Under this condition the signal ME cannot be cleared because the switch box contact 24 now assumes the dotted position, and the circuit for the control relay 1Z for this reason cannot be completed.

Let us now assume that the operator moves the lever $L^2$ to its dotted position. Under this condition the following circuit is closed provided the track section E and the fouling track circuit A is not occupied by another train:—beginning at the battery 10, wires 11 and 35, lever $L^2$, wires 36 and 37, winding of the indicating relay 2R, wire 38, front contact 39 of the track relay $T^3$, wire 40, winding of the relay 2Z, wire 41, switch box contact 24, wire 25, front contact 26 of the track relay T, wire 27, and common return wire C to the negative terminal of battery 10. With the control relay 2Z assuming its energized position, due to completion of this circuit the dwarf signal DE will assume the proceed position through the medium of the front contact 45 of the control relay 2Z. It is thus seen that the dwarf signal DE cannot assume its proceed position unless the track switch $S^1$ is in the take-siding position and the track relays T and $T^3$ are in their energized position.

Should either the track switch E or the fouling track circuit A be occupied at the time that the operator moves his lever $L^2$ he will be informed of that fact by reason of failure of the indicating lamp *de* to be illuminated, it being understood that with energizing current for the control relay 2Z actually flowing through indicating relay 2R connected in series therewith, the relay 2R will also assume its energized position, and will illuminate the indicating lamp *de* through a circuit including the front contact 46 of the indicating relay 2R. Although the track switches $S^1$ and $S^2$ have been assumed to be operable from the tower mechanically, these track switches may be operated by switch machines protected against dangerous operation by approach locking circuits and detector locking circuits, all in a manner as described in detail in my prior application Ser. No. 120,423, filed July 3, 1926, to which reference may be had, if desired.

Applicant has thus provided an interlocking system in which all of the features of interlocking are located locally with respect to the traffic controlling devices, and in which the control levers are free to be moved at any time, and in any manner, the entire protection against operating traffic controlling devices to positions conflicting with routes then set up being taken care of by local interlocking circuits including contacts of conflictable traffic controlling devices. Further, the system proposed indicates to the operator that a certain route cannot be set up in the event that such is the case, by failure of the indicating lamp on the miniature track layout to be illuminated in response to movement of the corresponding lever. Also, these same indicating lamps inform the operator of the passage of a train over the route set up, in that they indicate when the signal at the entrance to such route assumes its danger position in response to the movement of trains into such route.

Having thus shown and described one rather specific embodiment of the present invention, it is desired to be understood that the particular embodiment illustrated has been shown for the purpose of exemplifying the invention and facilitating description thereof, and has not been selected for the purpose of showing the exact construction and circuit arrangement preferably employed in practicing the same, and that various changes, modifications and additions may be made to adapt the invention to any particular track layout to which the invention is to be applied, all without departing from the spirit or scope of the invention, or the idea of means underlying the same, except as demanded by the scope of the following claims.

What I claim as new is:—

1. In an interlocking system, the combination with a plurality of levers in an interlocking tower free to be moved to any position at any time, a traffic controlling device for each lever controlled by such lever and located at a distant way station, a control relay associated with each traffic controlling device for controlling the operative condition of such device, a circuit controlled by one of said levers for a particular control relay including contacts mechanically operated by other and conflicting traffic controlling devices closed only when such conflicting traffic controlling devices are in their non-conflicting positions.

and indicating means in said interlocking tower included in series in said circuit at a point in said tower for indicating the continuity of said circuit through said particular control relay.

2. In an interlocking system, the combination with a plurality of levers in an interlocking tower free to be moved to any position at any time, a traffic controlling device for each lever controlled by such lever and located at a distant way station, a control relay associated with each traffic controlling device for controlling the operative condition of such device, a circuit controlled by one of said levers for a particular control relay including contacts mechanically operated by other and conflicting traffic controlling devices closed only when such conflicting traffic controlling devices are in their non-conflicting positions, an indicating relay in said interlocking tower included in series in said circuit at a point in said tower and assuming its attracted position when said circuit through said control relay is energized, and an indicator controlled by said indicating relay and rendered active when said indicating relay assumes its attracted position.

3. In an interlocking system, the combination with a plurality of levers in an interlocking tower free to be moved to any position at any time, a traffic controlling device for each lever controlled by such lever and located at a distant way station, a circuit controlled by one of said levers for controlling a particular traffic controlling device including contacts controlled by other and conflicting traffic controlling devices closed only when such other conflicting traffic controlling devices are in their non-conflicting positions, and means included in series in said circuit at a point in said interlocking tower for indicating at said tower the flow of current through said particular traffic controlling device and thereby indicating if any of said conflicting traffic controlling devices are in a conflicting position.

4. In an interlocking system, the combination with a plurality of levers in an interlocking tower free to be moved to any position at any time, a traffic controlling device for each lever controlled by such lever and located at a distant way station, a control relay associated with each traffic controlling device for controlling the operative condition of such device, a circuit controlled by one of said levers for controlling a particular control relay including contacts associated with other and conflicting traffic controlling devices closed only when such conflicting traffic controlling devices are in their non-conflicting positions, and indicating means in said interlocking tower and included in series in said circuit at a point in said tower for indicating the continuity of said circuit through said indicating means and through said particular traffic controlling device.

5. In an interlocking system, the combination with a plurality of levers in an interlocking tower free to be moved to any position at any time, a traffic controlling device for each lever controlled by such lever and located at a distant way station, a control relay associated with each traffic controlling device for controlling the operative condition of such device, a circuit controlled by one of said levers for a particular control relay including contacts associated with other and conflicting traffic controlling devices closed only when such conflicting traffic controlling devices are in their non-conflicting positions, an indicating relay in said interlocking tower and included in series in said circuit at a point in said tower and assuming its attracted position when said circuit is energized, and an indicator in said interlocking tower and controlled by said indicating relay and rendered active when said indicating relay assumes its attracted position to thereby indicate the condition of one traffic controlling device over the same circuit used for controlling another traffic controlling device.

6. In an interlocking system, the combination with a plurality of levers in an interlocking tower free to be moved to any position at any time, a wayside signal for a particular lever and located at a distant point, a track switch and an opposing signal ahead of said signal, a circuit controlled by said particular lever for controlling said first mentioned signal and including contacts controlled respectively in accordance with the position of said track switch and the position of said another signal in advance, said contacts being closed only if said another signal in advance is at stop and said track switch is in a non-conflicting position, and indicating means in said interlocking tower included in series in said circuit at a point in said tower for indicating if said contacts are closed.

7. In an interlocking system, the combination with a plurality of levers in an interlocking office each free to be moved to any position at any time, a wayside signal for governing traffic in a particular direction over a stretch of track, another wayside signal for governing traffic in the opposite direction over said stretch, a circuit for controlling one of said signals including a contact of one of said control levers and a contact closed only when the other signal is in its stop condition, and indicating means in said interlocking tower and included in series in said circuit at a point in said tower for indicating the continuity of said circuit and in turn the indicating condition of said other wayside signal.

8. In an interlocking system, the combination with a plurality of levers in an interlocking office each free to be moved to any position at any time, a wayside signal for governing traffic in a particular direction over a stretch of track, another wayside signal for governing traffic in the opposite direction over said stretch, a circuit controlled by one of said levers and for controlling one of said signals and including contacts closed only if said stretch of track is unoccupied and said other signal is in its stop condition, and indicating means in said interlocking tower and included in series in said circuit at a point in said tower for indicating the continuity of said circuit and in turn the occupancy of said stretch of track if said other signal is in the stop condition.

SEDGWICK N. WIGHT.